(12) United States Patent
Abramson et al.

(10) Patent No.: US 7,720,218 B2
(45) Date of Patent: May 18, 2010

(54) TELEPHONE WITH ENHANCED FUNCTION DISPLAY AND SELECTION ABILITY

(75) Inventors: Sandra R. Abramson, Freehold, NJ (US); James Farber, Rumson, NJ (US)

(73) Assignee: Avaya Inc., Basking Ridge, NJ (US)

( * ) Notice: Subject to any disclaimer, the term of this patent is extended or adjusted under 35 U.S.C. 154(b) by 504 days.

(21) Appl. No.: 11/694,666

(22) Filed: Mar. 30, 2007

(65) Prior Publication Data

US 2008/0240416 A1    Oct. 2, 2008

(51) Int. Cl.
*H04M 1/00* (2006.01)
*H04M 9/00* (2006.01)
(52) U.S. Cl. .............................. 379/428.03; 379/433.06
(58) Field of Classification Search .................
379/428.01–428.03, 419, 433.01, 433.04, 379/433.06
See application file for complete search history.

(56) References Cited

U.S. PATENT DOCUMENTS

2008/0080703 A1* 4/2008 Penning et al. ........ 379/428.02

* cited by examiner

*Primary Examiner*—Tuan D Nguyen
(74) *Attorney, Agent, or Firm*—Muncy, Geissler, Olds & Lowe, PLLC

(57) ABSTRACT

A user interface, telephony device, and method for managing user control settings associated with a telephony device is described. The user interface displays a label array on a display device of the telephony device. The label array includes at least one row of labels, each representing a discrete function or feature associated with the telephony device. A button array is provided in the vicinity of the display device. The button array includes a corresponding row or rows of buttons, each button representing a discrete function or feature for the telephony device and corresponding to a label within the label array. One or more buttons in the button array are selectively illuminated to indicate a status of one or more functions or features associated with one or more labels in the label array.

34 Claims, 5 Drawing Sheets

TELEPHONE WITH ENHANCED FUNCTION DISPLAY AND SELECTION ABILITY

BACKGROUND

This description generally relates to telecommunication devices having displays, and more particularly to telecommunication devices having displays providing one or more various functions or options icons that are selectable by the user.

DESCRIPTION OF THE BACKGROUND ART

Conventional telephones, such as deskphones and cellular phones, often include displays which provide a plurality of different telephone functions or settings selectable by the user, e.g., Send All Calls, Priority, Call Forward, Directory, various display settings, default modes, and/or ring tones. However, the user is often required to perform several operations and/or key strokes to view and select a desired function or options menu.

Existing telephones typically allow a user to select a desired telephone function through the use of a user activated menu. For example, the user presses a menu key, which causes the display to display a list of functions supported by the telephone. As telephones become more and more sophisticated, the list of supported functions has become rather long. If a list of supported functions includes 32 discrete functions, the user must cycle past the undesired functions using navigation inputs of the telephone, e.g. up/down arrow keys, which require numerous, time-intensive keystrokes.

One conventional approach for managing displayed functions is loop scrolling. In loop scrolling, if the desired function is toward the end of the functionality list, the user may scroll backwards, e.g. pressing the down arrow key will take the user from the first function to the last function on the functions menu, e.g., loop scrolling forward or backwards through available functions.

Another conventional approach involves categorizing the different functions and creating submenus for display. For example, a display supporting 32 various functions could be divided into four submenus, such that the list of telephone functions for each sub menu is shorter and more easily navigated. The user then accesses each of the submenus to identify functions or options within each respective submenu.

SUMMARY

Backwards scrolling or loop scrolling provides a shortcut to reaching the desired functions in a long list of functions. However, if the desired function is in the middle of a list of function, e.g., number 15 in a list of 30 possible functions, it will take 15 keystrokes to reach it regardless of the scroll direction. Since effective backwards scrolling is most advantageous if the user knows that the desired function is toward the end of the list, the accessibility of functions is not necessarily intuitive and may require knowledge gleaned from experience with the system and/or a reading of the owner's manual.

Submenus may be limited in their effectiveness as well. For example, often a function could be characterized under different submenus, e.g., ring tone setting may be characterized under the submenu heading "default settings" or under the submenu heading "audio controls." Accordingly, a user will often explore one or more submenus before finding the submenu containing the desired function. The submenu categorization can be intuitive for some functions, but must be learned through experience or manual review for other functions. The selection of the submenu from the main menu is an additional step and also consumes the user's time.

Therefore, there exists a need in the art for an easier system and a more intuitive interface for the user to view and select possible functions of the telephone using the telephone's display.

In one general aspect, a user interface for a telephony device includes a display device configured to display a label array. The label array includes labels each representing a discrete function or feature associated with the telephony device. The user interface includes a button array in the vicinity of the display device, the button array including buttons, each button configured to control a discrete function or feature for the telephony device and corresponding to a respective label within the label array, wherein one or more of the buttons are configured to be selectively and dynamically illuminated to indicate a first operational state of the respective feature or function and to be non-illuminated to indicate a second operational state of the respective feature or function.

Implementations of this aspect may include one or more of the following features. For example, the display device may be configured to display a first set of labels and an alternative, second set of labels, the labels being arranged in at least two rows and two columns and the button array including at least two rows and two columns of buttons. The button array may include one or more buttons configured to selectively illuminate to indicate operational states of corresponding labels in each of the first set of labels and the second set of labels depending upon which set of labels is displayed in the label array. The display device may be configured to dynamically update a representation of a label in the label array depending upon the first operational state of the respective function or feature and in response to an input received at a corresponding button in the button array.

The one or more buttons may include softkeys. The user interface may include an alphanumeric, telephony keypad separate from the button array or the button array may be part of the alphanumeric keypad. The alphanumeric telephony keypad may be an ISO (International Standards Organization) standard alphanumeric telephony keypad. The button array may include softkeys. The button array may include eight softkeys. The display device may be configured to display eight labels in the label array at a time. The display device may be configured to display multiple sets of labels, e.g., such as four sets, one set of labels at a time, and a number of labels, e.g., such as four labels, in each set of labels equals a number of buttons in the button array.

The button array may include softkeys, each softkey being associated with a corresponding label in the label array. The button array may consist of eight softkeys and each set of labels consists of eight labels.

In another general aspect, a telephony device includes a user interface having a display device and a button array arranged in the vicinity of the display device. The display device is configured to display a label array, the label array including labels each representing a discrete function or feature associated with the telephony device. The buttons in the button array are each configured to control a discrete function or feature for the telephony device and correspond to a respective label within the label array. One or more of the buttons are configured to be selectively and dynamically illuminated to indicate a first operational state of the respective feature or function and to be non-illuminated to indicate a second operational state of the respective feature or function.

Implementations of this aspect may include one or more of the following features. For example, the display device may be configured to display a first set of labels and an alternative, second set of labels, the labels being arranged in at least two rows and two columns and the button array including at least two rows and two columns of buttons. The button array may include one or more buttons configured to selectively illuminate to indicate operational states of corresponding labels in each of the first set of labels and the second set of labels depending upon which set of labels is displayed in the label array. The display device may be configured to dynamically update a representation of a label in the label array depending upon the first operational state of the respective function or feature and in response to an input received at a corresponding button in the button array.

The one or more buttons may include softkeys. The user interface may include an alphanumeric, telephony keypad separate from the button array or the button array may be part of the alphanumeric keypad. The alphanumeric telephony keypad may be an ISO (International Standards Organization) standard alphanumeric telephony keypad. The button array may include softkeys. The button array may include eight softkeys. The display device may be configured to display eight labels in the label array at a time. The display device may be configured to display multiple sets of labels, e.g., such as four sets, one set of labels at a time, and a number of labels, e.g., such as four labels, in each set of labels equals a number of buttons in the button array.

The button array may include softkeys, each softkey being associated with a corresponding label in the label array. The button array may consist of eight softkeys and each set of labels consists of eight labels. The telephony device may include a deskphone, cellular phone, and/or a PDA.

In another general aspect, a method for managing user control settings associated with a telephony device includes displaying a label array on a display device of the telephony device, the label array including labels each representing a discrete function or feature associated with the telephony device. One or more buttons on a button array of the telephony device are selectively and dynamically illuminated to indicate a first operational state of a respective feature or function for the telephony device. The button array includes buttons, each button being configured to control a discrete function or feature for the telephony device and corresponding to a respective label within the label array. An illumination feature of one or more buttons on the button array are selectively and dynamically turned off to indicate a second operational state of the respective feature or function for the telephony device.

Implementations of this aspect may include one or more of the following features. For example, the label array may include labels arranged in rows and columns and the button array may include softkeys arranged in rows and columns. A layout of the labels in the label array, e.g., a matrix of two rows and four columns containing eight labels total, may substantially correspond to a layout of the softkeys in the button array, e.g., a matrix of two rows and four columns containing eight softkeys total. A representation of a label in the label array may be dynamically updated depending upon the first operational state of the respective function or feature.

In another general aspect, a computer-readable medium has computer-executable instructions contained therein for performing a method for managing user control settings associated with a telephony device. The method includes displaying a label array on a display device of the telephony device, the label array including labels each representing a discrete function or feature associated with the telephony device. One or more buttons on a button array of the telephony device are selectively and dynamically illuminated to indicate a first operational state of a respective feature or function for the telephony device. The button array includes buttons, each button being configured to control a discrete function or feature for the telephony device and corresponding to a respective label within the label array. An illumination feature of one or more buttons on the button array are selectively and dynamically turned off to indicate a second operational state of the respective feature or function for the telephony device.

One or more of the foregoing aspects may provide one or more of the following advantages. The selective illumination of buttons, such as softkeys, in a button array that correspond to a set of labels in a display provides the user with an efficient way of quickly and visually identifying multiple control features or functions for a telephony device. The buttons may be illuminated or non-illuminated depending upon the current set of labels being displayed in the display, e.g., the label array and the illumination features of the button array may be dynamically updated in response to user selection of a particular set of labels.

BRIEF DESCRIPTION OF THE DRAWINGS

Further aspects and advantages will become apparent upon reading the following detailed description taken in conjunction with the accompanying drawings summarized below.

DETAILED DESCRIPTION

Embodiments consistent with the present invention are more specifically set forth in the following description with reference to the appended figures. Wherever possible, the same reference numbers will be used throughout the drawings to refer to the same or like parts.

Figure 1:
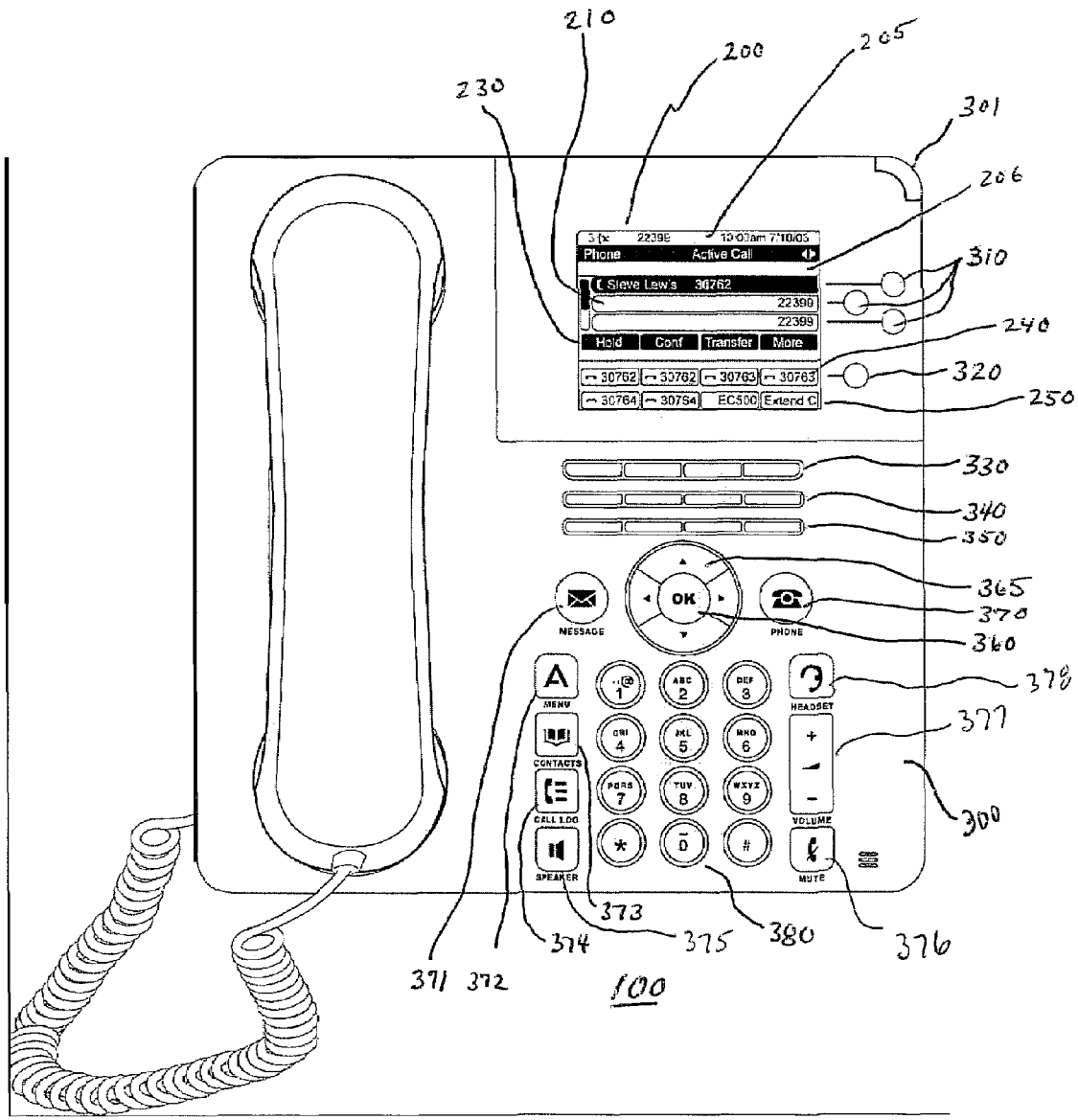
FIG. 1 is a plan view of an exemplary telephone having a display device.

Referring to FIG. 1, an exemplary deskphone 100 includes a display 200 and a keypad portion 300. Although the following exemplary embodiment is described in connection with a deskphone, the following description is applicable to various types of phones, including mobile phones and/or other handheld devices, such as personal digital assistants (PDAs). The keypad portion 300 includes a standard alphanumeric telephone keypad 380 for inputting numbers for calls, activating various features, and/or input of text. The keypad portion 300 includes a message button 371, a phone button 370, and a user navigation device, which includes exemplary directional arrows 365, and a select or OK button 360 for activating audio menu options and/or features selectable from the display 200. The message button 371 permits the user to access voicemail messages and the phone button 370 permits the user to access information relating to active calls.

The deskphone 100 includes a menu button 372, contacts button 373, call log button 374, and speaker button 375, which each provide the user with access to various functions of the deskphone 100. The menu button 372 provides the user with access to adjust and customize options and settings for the telephone, to access Web-based applications, to obtain information about phone or network settings, and/or to log out of the menu feature. The accessible options are typically designated by a system administrator or by the manufacturer dependent upon network capabilities and the level of access and features appropriate for the client device and/or user. Alternatively, or additionally, the accessible options may be adjusted locally at the client device by a user provided with the appropriate level of network access to alter settings on the client device. The contacts button 373 provides access to a list of stored contacts, e.g., for viewing or editing, and the call log button 374 permits the user to view one or more lists relating to the most recent incoming, outgoing, and/or missed calls. The speaker button 375 activates or deactivates the speaker option for the telephone.

The keypad portion 300 also includes a headset option 378, volume adjustment 377, mute button 376 for muting an active call, and a message waiting indicator 301 which provides the user with an indication of voice, email, and/or text messages waiting for the user. The headset option 378 toggles the telephone between a handset/speaker mode and a headset mode for listening to calls and messages. The volume adjustment 377 adjusts the master volume for the deskphone 100. Alternatively, or additionally, volume options may be provided through the activation of the menu button 372 and/or through selectable options on the display 200.

The display 200 includes a status line 205 which may contain information relating to a number of missed calls, a relevant extension number of the most recent missed call, and a date and time field. A prompt line 206 contains information relating to a current call, such as an extension of an active or incoming call, and one or more application lines 210 provide information relating to available lines or extensions, e.g., call information, such as an incoming caller's name and a recipient users extension or name. The application lines 210 are activated with line buttons 310 which allow the user to select an active application line. For example, a highlighted line is shown in FIG. 1 which indicates that a call from "Steve Lewis 30762" is currently active or selected by the user of the deskphone 100.

The display 200 includes a softkey label array which includes softkey labels 230 and auxiliary softkey labels 240, 250. The softkey labels 230 are icons automatically generated and presented to the user depending upon the status of the deskphone 100. For example, the softkey labels 230 shown in FIG. 1, including the [Hold], [Conf], [Transfer], and [More] icons, are indicative of available actions which are presented to the user on the display 200 since the line button 310 associated with the 30762 (Steve Lewis) call has been selected by the user. The auxiliary softkey labels 240, 250 are icons which are automatically generated and presented to the user responsive to a user input to an auxiliary shift button 320. For example, the display 200 includes one row of four softkey labels 230 and two rows of auxiliary softkey labels 240, 250, each containing four icons. Accordingly, the viewable set of auxiliary softkey labels are changed each time the auxiliary shift button 320 is activated by the user, e.g., a new set of eight auxiliary softkey labels is presented to the user. While one auxiliary shift button 320 is shown in FIG. 1, an additional auxiliary shift button 320 may be provided on the opposite side of the display 200, e.g., in a mirrored position on the left side of the display 200 with respect to the auxiliary shift button 320 which is shown positioned on the right side of the display 200.

If two or more auxiliary shift buttons 320 are provided, each may be provided with alternative scrolling capabilities, e.g., another auxiliary shift button 320 positioned on the left side of the display 200 may be configured to provide backward scrolling through sets of auxiliary softkey labels 240, 250 and the auxiliary shift button positioned on the right side of the display 200 may be configured to provide forward scrolling through sets of auxiliary softkey labels, 240, 250. The softkey labels 230 and auxiliary softkey labels 240, 250 may be preprogrammed into the deskphone 200 by a system administrator, the user of the telephone, and/or any other authorized user. The softkey labels 230 and auxiliary softkey labels 240, 250 are programmed to correspond to additional bridged extensions, dial buttons, call options, or any other phone feature or option available for managing calls, call information, and/or additional phone terminals, e.g., such as external phone terminals such as user's cellular telephone. The softkey labels 230 and auxiliary softkey labels 240, 250 may include graphical icons, keywords, alphanumeric identifiers, and/or any combination thereof for each function which is displayed at each softkey label 230, 240, 250.

While the softkey labels 230 typically appear automatically in response to the active status of the deskphone 100, the auxiliary softkey labels 240, 250 that are displayed are controllable by the user through the auxiliary shift button(s) 320. However, one or more of the rows of auxiliary softkey labels 240, 250 may be configured to be automatically displayed dependent upon the active status of the deskphone 100, and the auxiliary shift button(s) 320 may be optionally provided in the particular deskphone 100. Alternatively, the display of the softkey labels 230 may also be controlled through the use of another shift button, e.g., similar to auxiliary shift button 320 (but not shown). Accordingly, the user may be automatically presented with twelve immediately accessible features or options that may be displayed based on the active status of the deskphone 100 and/or based on inputs received at an auxiliary shift button(s) 320. In addition, the options may be selectively and/or automatically changed based on changes in the status of the deskphone 100, e.g., the user shifts from managing voicemail messages to engaging a call with another user on another client device.

The deskphone 100 also includes a button array which includes softkey buttons 330, and two rows of auxiliary softkey buttons 340, 350. Referring to FIG. 1, the button array is shown having one row of four softkey buttons 330 which correspond to and are positioned so as to be substantially horizontally aligned with the row of softkey labels 230 positioned above the button array and on the display 200, e.g., an individual column of softkey labels 230, 240, 250 is horizontally aligned with a corresponding column of softkey buttons 330, 340, 350 about a common vertical axis extending through the column. However, since the button array may include buttons that are slightly larger than the corresponding softkey labels to facilitate easier manipulation with a user's fingers, the button array and softkey label array may be slightly misaligned to account for the difference in size between the two arrays (e.g., as shown in FIG. 1).

The button array may include two or more rows of auxiliary softkey buttons 340, 350. Each row of auxiliary softkey buttons 340, 350 contains four auxiliary softkey buttons which correspond to, and are positioned so as to be substantially horizontally aligned with the two rows of auxiliary softkey labels 240, 250 on the display 200. Accordingly, the various softkey labels 230, 240, 250 and corresponding softkey buttons 330, 340, 350 may be sized and shaped to have similar appearances so that the user intuitively associates the corresponding softkey buttons 330, 340, 350 with the appropriate softkey labels 230, 240, 250 in the softkey label array.

One or more rows of buttons 330, 340, 350 may include illumination elements, such as internal LEDs which provide backlighting through a relatively clear or translucent cover forming the buttons. Whenever a function icon is activated by the user or system, the appropriate button in the button array would be illuminated. Alternatively, or additionally, the corresponding softkey labels 230 or auxiliary softkey labels 240, 250 may be highlighted and/or presented in various fonts, such as, for example, italics, various colors, underlined, and/or in bold-faced type. For example, if the softkey label array includes two row of icons with three icons per row (or four icons per row as shown in FIG. 1), the button array would include two rows of corresponding buttons with three buttons per row (or four buttons per row as shown in FIG. 1). If the user toggles the array of auxiliary softkey labels 240, 250 to bring up a new set of available softkey labels 240, 250, the corresponding auxiliary buttons 340, 350 may be illuminated based on whether a particular setting or feature has been designated, e.g., a "mute" function shown as an available auxiliary softkey label may result in the corresponding auxiliary softkey button being illuminated if the mute option is activated, and appear non-illuminated if the mute option is currently not selected by the user. Accordingly, the button array and softkey label arrays serve as intuitive, visual indicators of the current status of numerous functions/settings within a single view of a user interface.

Figure 2:
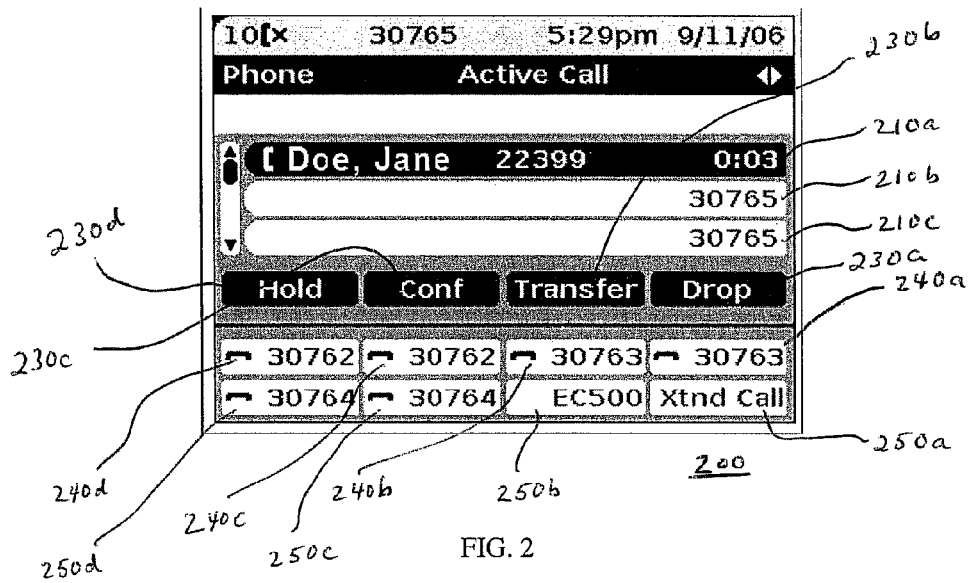
FIG. 2 is an exemplary screenshot of a display of the deskphone of FIG. 1.

Referring to FIGS. 2-6, exemplary screenshots of display 200 show various functions, options, and/or menus accessible through the deskphone 100. Referring to FIG. 2, the display 200 includes three application lines 210*a*, 210*b*, and 210*c*, a softkey array having one row of softkey labels 230*a-d*, and two rows of auxiliary softkey labels 240*a-d*, 250*a-d*. Application line 210*a* is shown as a highlighted line since the first line is supporting, an active call between the deskphone user and Jane Doe, on extension 22399. The application line 210*a* also indicates that the call has been ongoing for approximately three seconds as indicated in the timer field on the application line. The user is able to toggle between available lines by pressing the corresponding application line button 310 (see FIG. 1). Since the first application line 210*a* is active, the softkey labels 230*a-d* which are appropriate for the ongoing call are automatically displayed on the screen. The softkey labels permit the user to place the call on hold, initiate a conference call, transfer the call, or drop the call. The auxiliary softkey labels 240*a-d*, 250*a-d* provide available line extensions, e.g., to facilitate conference calling or call forwarding, and additional features, such as extension to cellular EC500 250*b*, e.g., a feature enabling the user to extend operation of the deskphone to an external communication device, such as receiving calls and call information, such as inbound or outbound caller id information, which was directed to a deskphone, at a cellular phone. For example, a user of the deskphone 100 can receive calls at a mobile phone and conduct telephone calls while remaining transparent to the other client device, e.g., the other user involved in a phone call may still received caller id information indicating that the user is at the deskphone 100 despite actually communicating through a mobile phone or other external client device. Application lines 210*b*, 210*c* are unselected lines, and therefore are not highlighted.

Figure 3:
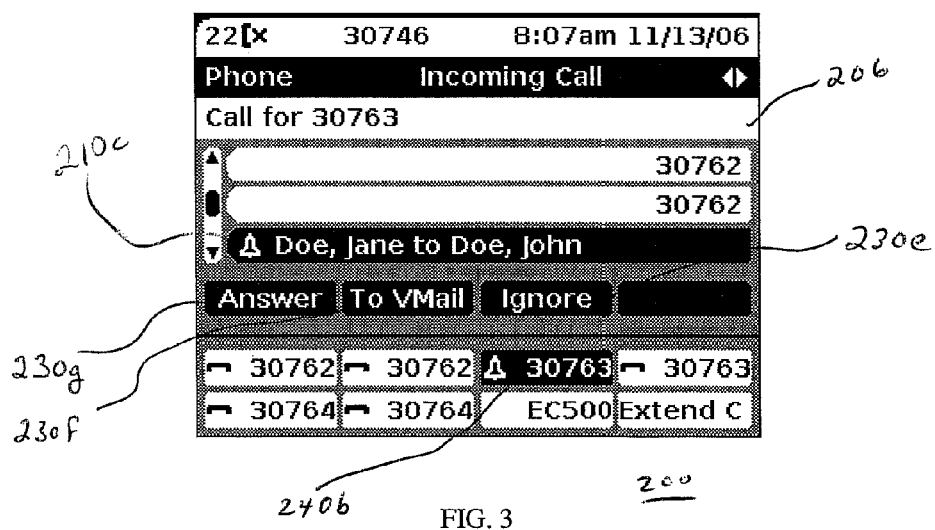
FIG. 3 is an exemplary screenshot of a display of the deskphone of FIG. 1.

Referring to FIG. 3, an exemplary screenshot shows an incoming call which has not yet been acknowledged by a user of the deskphone 100. The application line 210*c* is highlighted which shows that an incoming call from Jane Doe is being placed to John Doe at extension 30763. In this example, the deskphone 100 is being used to monitor a bridged line. Accordingly, the user is presented, through the combination of automatically generated softkey labels 230*e-g*, available options for the incoming call on the bridged line. Specifically, the user of the deskphone 100 can choose to answer the call 230*g*, forward the call to voicemail 230*f*, or ignore the call 230*e*. In addition, the highlighted auxiliary label 240*b* indicates that the call is for extension 30763 and may also be provided with an icon or other visible feature, e.g., the ringing icon shown in FIG. 3 to show the 30763 extension is receiving an incoming call.

Figure 4A:
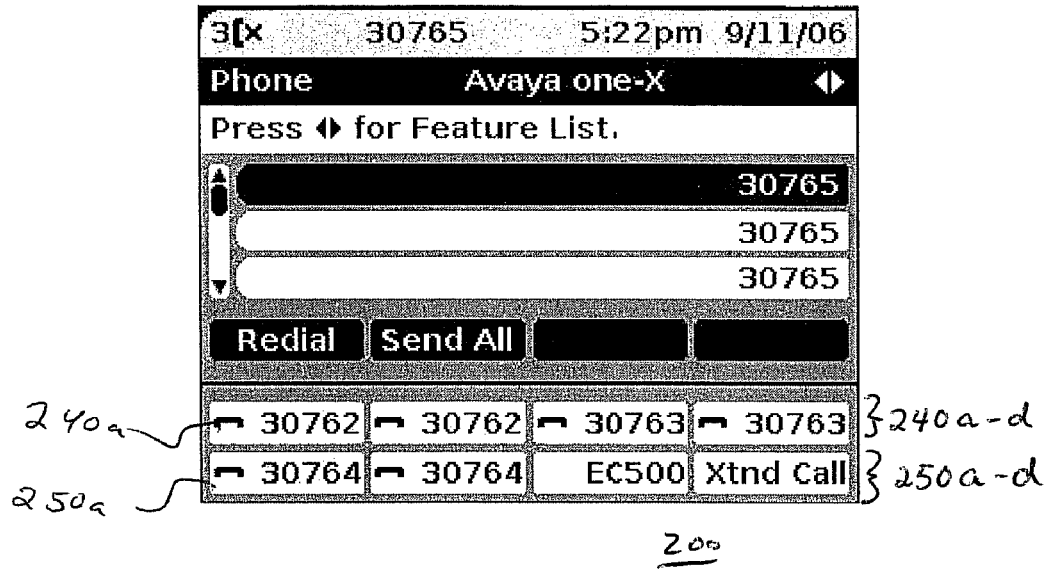
FIGS. 4A-4B are exemplary screenshots of a display of the deskphone of FIG. 1 selectable by a user through an auxiliary shift button provided next to the display.
Figure 4B:
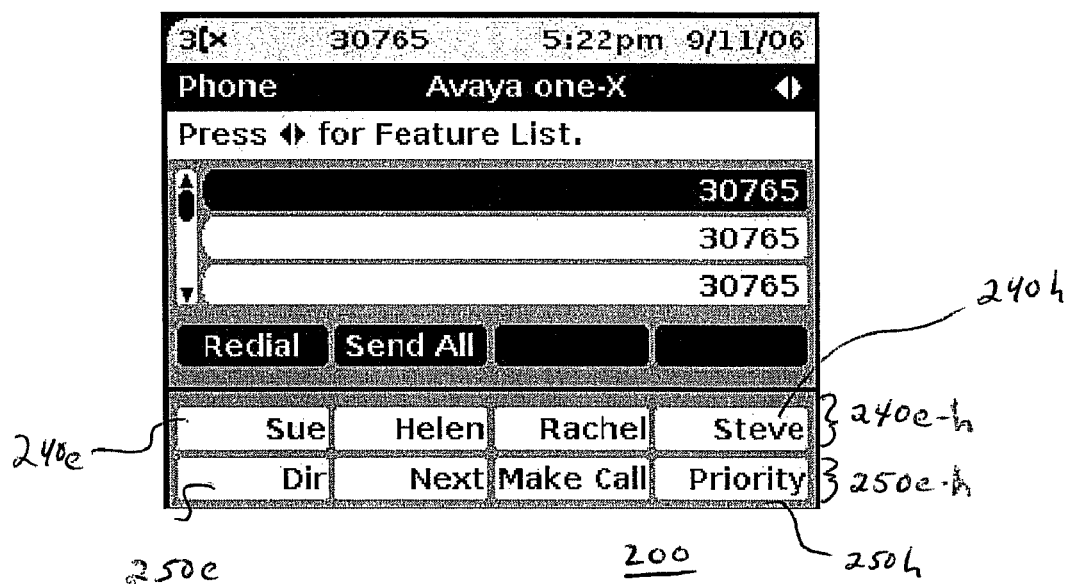

Referring to FIGS. 4A-4B, exemplary screenshots show a display with two different sets or pages of auxiliary softkey labels 240*a-h*, 250*a-h*. A first page of eight auxiliary softkey labels 240*a-d*, 250*a-d* displays available extensions, bridged lines, call options, and/or phone options. The second page of eight auxiliary softkey labels 240*e-h*, 250*e-h*, show a discrete set of extensions, bridged lines, call options, and/or phone options. Each of the auxiliary softkey labels 240*a-h*, 250*a-h* are selectable by the user by activating the corresponding auxiliary softkey buttons 340, 350 (shown in FIGS. 1 and 7). The second set of auxiliary softkey labels 240*e-h*, 250*e-h* includes speed dial buttons for specific users 240*e-h*, e.g., Sue, Helen, Rachel, and Steve; directory features 250*e-g*, e.g., directory, next, and make call; and a priority calling feature 250*h*. The combination of softkeys and auxiliary softkey labels 230, 240, 250 provides the phone 100 with the capability of presenting twelve options immediately to the user, and to modify the available auxiliary softkey labels, e.g., eight softkey labels at a time, by toggling the auxiliary shift button(s) 320.

Figure 5:
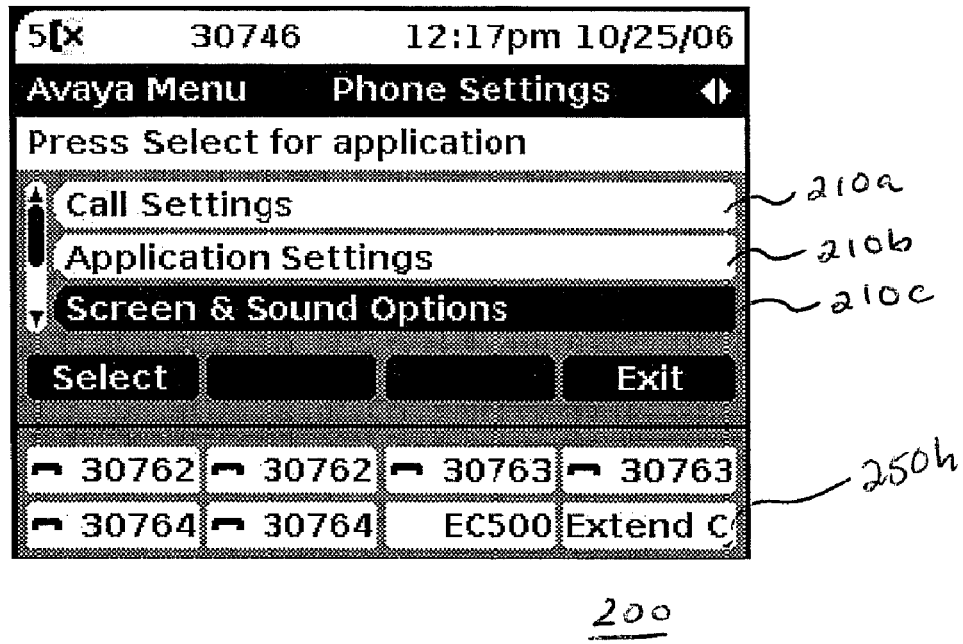
FIG. 5 is an exemplary screenshot of a display of the deskphone of FIG. 1.
Figure 6:
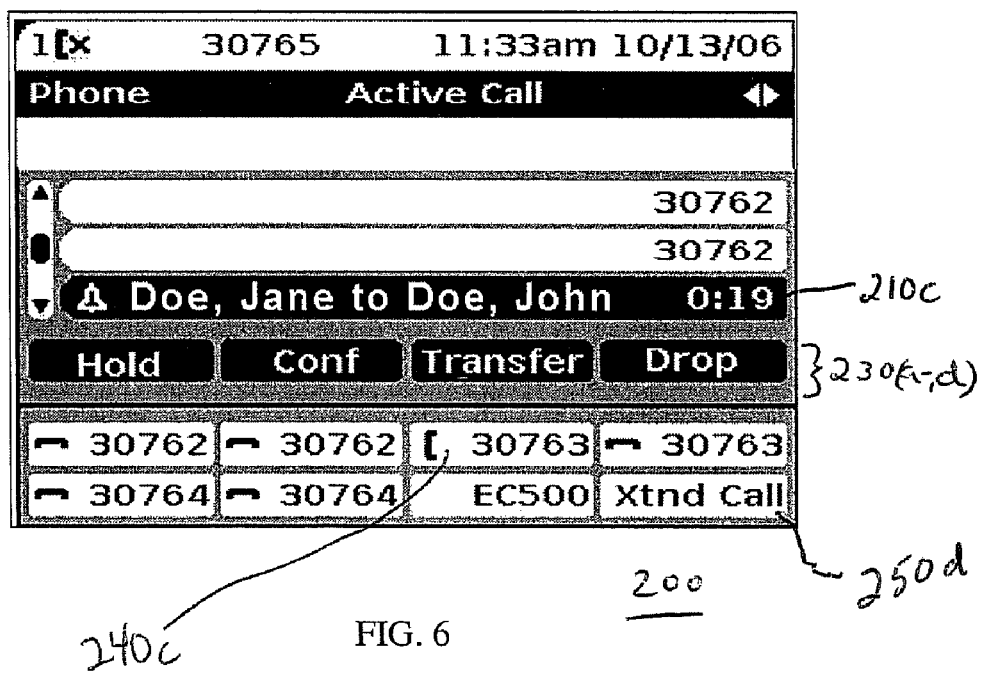
FIG. 6 is an exemplary screenshot of a display of the deskphone of FIG. 1.

Referring to FIGS. 5 and 6, exemplary screenshots show available softkey labels and auxiliary softkey labels that have been generated automatically based solely on the selected application line 210*c*. In FIG. 5, the third application line 210*c* has been selected which resulted in screen and sound options being highlighted, a select and exit option being presented on the softkey label row, and a first set of automatically generated auxiliary softkey labels, e.g., the user did not have to use the auxiliary shift button 320 to change the auxiliary softkey labels 240, 250. In FIG. 6, an ongoing call between Jane Doe and John Doe, with a duration of nineteen seconds, on extension 30763, results in the softkey labels 230*a-d* being presented to the user. Specifically, the user of the deskphone 100 can choose to hold, conference, transfer, or drop (230*a-d*, respectively) the ongoing call by activating the corresponding softkey button 330 in the button array. The auxiliary softkey label 250*h* [Extend to Cellular] in FIG. 5, which provides the user with the capability to forward all calls from the deskphone to a mobile phone, is replaced with another auxiliary softkey label 250*d* [Xtnd Call] in FIG. 6, which provides the user with the ability to extend an active call to a cellular phone, e.g., permitting a user to continue a conversation started on the deskphone 100 on a mobile phone.

Figure 7:
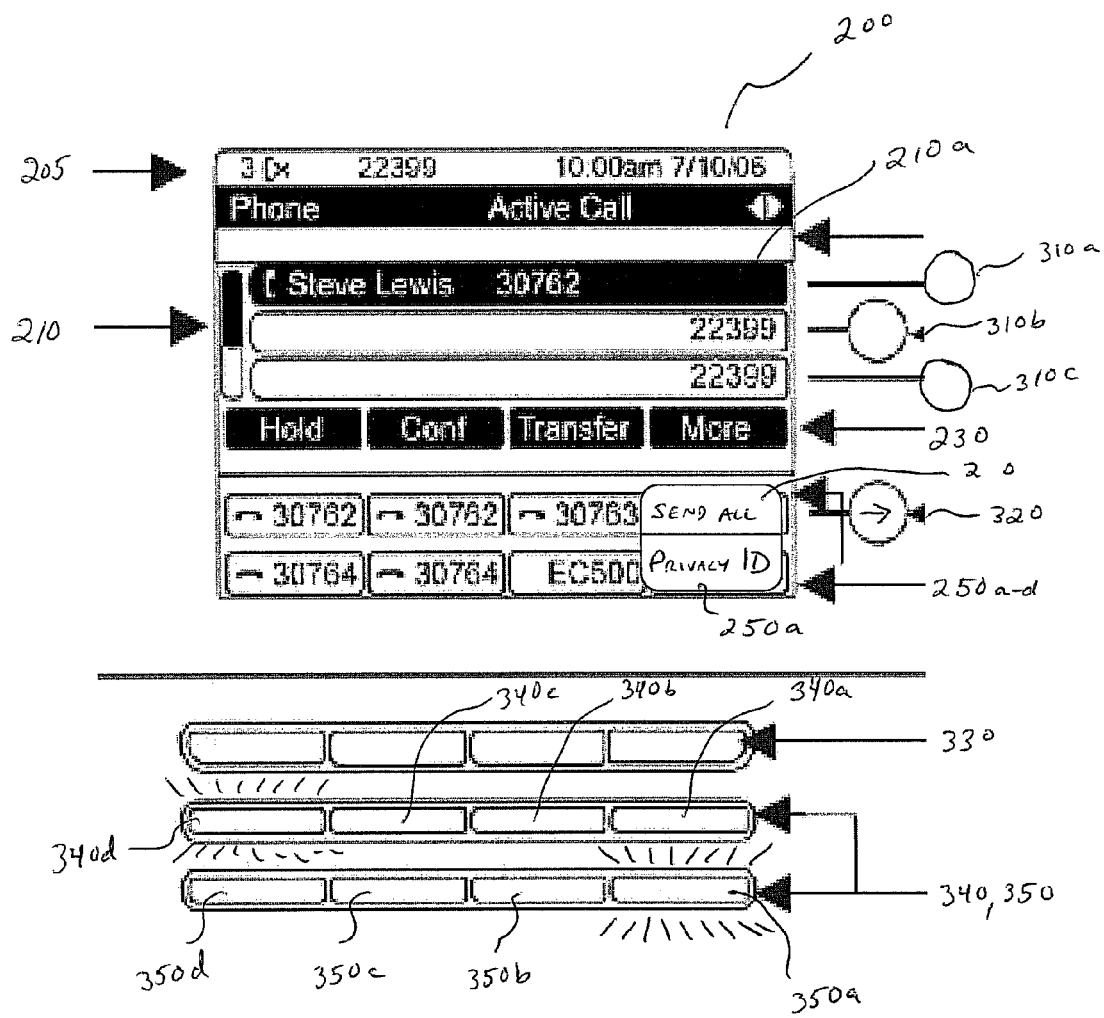
FIG. 7 is an enlarged view of an exemplary user interface for the deskphone of FIG. 1 showing softkeys and two rows of auxiliary buttons which correspond to softkey labels and auxiliary button labels provided on the display.

Referring to FIG. 7, an enlarged view of a display 200 and a softkey button array shows softkey buttons that are illuminated, e.g., with backlighting provided through individual LEDs. The display 200 includes an active call with Steve Lewis on extension 30762, e.g., as indicated by the first application line 210*a* being highlighted and the auxiliary button 340*d* which corresponds to extension 30762 being illuminated. Features or extensions that are not currently in use are easily recognized by the auxiliary softkey buttons 350*b-d*, 340*a-c*, which are not illuminated. The privacy ID softkey label 250*a* is also shown as being active, e.g., by the illumination of auxiliary softkey button 350*a*. The illumination of the corresponding privacy ID button 350*a* indicates that the user is currently restricting the outgoing caller ID to indicate "private" only for the current call.

Implementations of the foregoing embodiment may include one or more of the following additional or alternative features. For example, while the deskphone 100 has been described in connection with a display 200 which can show a fixed number of icons or alphanumeric representations of features in three rows, e.g., one row of softkeys and two rows of auxiliary softkeys, the number of rows and the number of softkeys and softkey labels in each row may be modified to increase or decrease the number of features available to the user. In the arrangement shown in FIG. 1, the combination of eight auxiliary softkey labels (and auxiliary softkey buttons) and four softkeys provides up to twelve options that may be presented to the user at any one time. The softkey labels may be configured to be automatically generated in response to the active status, e.g., the selected application line 210, of the deskphone 100. While the auxiliary softkey labels are organized into sets of functions that may be toggled through the auxiliary shift button(s) 320, e.g., four sets of eight auxiliary softkey labels providing 32 additional features to the user, the auxiliary softkey labels may also be automatically generated dependent upon active status of the phone. For example, two, preset rows of four auxiliary softkey labels may be automatically displayed in the softkey label array each time a new call is initiated. Accordingly, each time a user initiates or accepts an incoming call, the auxiliary softkey labels may update to a default list of options, e.g., despite having been previously toggled to a discrete set by the user immediately prior to initiating or accepting the call.

The softkey labels 230-250 each represent a function or option related to the telephone. The labels may include key words, icons, and/or any combination of alphanumeric characters, symbols, and fonts. Some possible functions that may be displayed as auxiliary softkey labels 240, 250 include, but are not limited to, Send all calls, Priority, Call Forwarding, Directory, Next, Make Call, Extending to Cellular, Extend current call to cellular, Default settings, Set distinctive ring tones, and/or Caller ID settings. For example, the auxiliary softkey labels can be used to present 32 different functions or options, e.g., four sets of eight softkey labels, to the user in readily accessible and selectable formats. Accordingly, the displays are intuitive and easily accessed by a user in a manner that is greatly improved over the previous approaches of the background art.

The line buttons 310 and auxiliary shift buttons 320 may be illuminated depending on the status and/or in response to any user inputs. The line buttons 310 and shift buttons 320 may include markings or characters which assist the user in identifying the functionality of the device, e.g., the auxiliary shift buttons 320 may include a directional arrow pointing away from the side of the display which the button is positioned. The activation of the auxiliary shift button(s) 320 will replace the current set of auxiliary softkey labels. However, it may be desirable to limit the replacement or updating of auxiliary softkey shift labels to partial scrolling through sets of softkey labels, e.g., only two auxiliary softkey labels are replaced at a time. In either case, replacement of auxiliary softkey labels may take place visually as a rightward scrolling of the existing labels to the right in a quick stepwise manner to make the change direction intuitive to the user.

Another auxiliary shift button 320 may be located to the other side of the display (e.g. to the left) to allow the user to scroll the function icon back onto the screen. Alternatively, these buttons 320 may be positioned on the same side of the display and include directional arrows indicating the direction in which scrolling will take place. The user may also right scroll through the entire set of function labels, e.g., which would only be four sets of labels if 32 possible telephone functions are displayed per set, to return to the previously viewed icon array. Accordingly, the auxiliary shift button may incorporate loop scrolling and/or rightward and leftward scrolling through available auxiliary softkey labels.

The illumination (and non-illumination) of auxiliary softkey buttons, e.g., through internal LEDs, may be applied to all features represented through the softkey label and softkey button arrays. For example, an array of auxiliary softkey labels may include two rows of labels with three labels per row, and the button array may include two rows of button with three buttons per row. If the auxiliary softkey labels were as follows:

Silent Mode Extend to Cellular Directory
Privacy ID Default Settings Call Forwarding As the user visually scanned the button array, the buttons would be illuminated to indicate the on status of each of the modes for the auxiliary softkey labels. Accordingly, if the Silent Mode, Extend to Cellular, and Privacy ID labels are illuminated in the button array, the user would instantly know that the present telephone settings include silent mode is on, e.g., ringer is muted, extend to cellular is on, e.g. telephone calls to the desktop telephone will ring on the user's cellular telephone and the desktop telephone, and the privacy ID is on (the user is restricting the outgoing caller ID). The directory is off (button not illuminated), the default settings are off (button not illuminated), and the call forwarding is off (button not illuminated), e.g., at present the desktop telephone is not forwarding calls to an outside line. In some cases, the non-illumination of a button may be insignificant, e.g., the feature is not an on/off type of feature. For example, the non-illumination of the directory function may be meaningless as the directory has no on or off status. However, the button position's illumination ability may be used in a different set of softkey labels, e.g., after the auxiliary shift button 320 is toggled.

If the operational state of the feature or function associated with the labels changes, e.g., from "on" to "off," the corresponding softkey may be selectively and dynamically illuminated or non-illuminated (turned off) to indicate operational settings for several settings simultaneously. Alternatively, or additionally, the individual labels displayed on the display may also be altered in their representation. For example, the Silent Mode may be presented in italics or normal font depending on status, and/or an icon or check mark may be displayed next to the label description in the display which is further indicative of the current operational state of the respective feature or function associated with the label and corresponding softkey.

Each time the user scrolls to the next set of auxiliary softkey labels, the illumination of the buttons in the button array would change to indicate the status of the next set of functions displayed in the softkey label array. Accordingly, the user can more quickly access a desired function on the desktop telephone, e.g., with relatively few key strokes. The foregoing interfaces are more intuitive as compared to the submenu solutions of the background art, e.g., the user can easy discern the status of multiple "on/off" type functions of the desktop telephone without having to enter or scroll through each function individually.

While the foregoing implementations have been described in connection with a deskphone 100, any telephony device supporting circuit switching, packet switching, and/or other telephony networking may benefit from the implementations. Accordingly, the foregoing implementations are equally applicable to PDAs, VoIP phones, and/or mobile phones. An exemplary telephony device that may incorporate one or more of the foregoing implementations includes any of the Avaya ONE-X deskphones, such as the Avaya ONE-X 9600 and 9650 series.

The telephony device, e.g., deskphone 100 shown and described in connection with FIG. 1, may include a processor, a memory, the display 200, and an input/output interface. In addition, the phone, e.g., if used in a network, may include a network interface for sending and receiving data over a network connection, e.g., such as a standard RJ-45 Ethernet connection. The processor may include one or more processors for controlling, interpreting, and/or processing data exchanged between the telephony device and the network. The memory may be one or more memory devices or media capable of storing data or instructions. In addition, or alternatively, the telephony device may include an integrated processing device or module, e.g., an analog telephony adapter (ATA) and/or combination of client software residing in memory. The ATA and/or client software may utilize audio codecs to handle data packet conversion, e.g., digital-to-analog conversion of incoming voice data. One or more telecommunications protocols, such as, for example, H.323, may be used to define ways in which video, audio, and/or data is processed and/or transferred through the network which the telephony device is connected.

The preprogramming of the auxiliary softkey labels 240, 250 and/or softkey labels 230 into the telephony device can be achieved in several ways. For example, a system administrator, manufacturer, and/or user may update settings or functions, e.g., control which auxiliary softkey labels are displayed, through periodic updates, e.g., network patches sent to individual client devices to implement global and/or local updates to software resident in the memory of the telephony device. Alternatively, or additionally, the adjustment of softkey label settings may be implemented through a settings menu within the individual client device, e.g., through the menu option button 372. Exemplary methods of administering and/or programming an applicable telephony device are described in greater detail in *Avaya one-X Deskphone Edition for* 9600 *Series IP Telephones Administrator Guide Release* 1.2, Doc. No. 16-300698, e.g., available at http://support.avaya.com, the entire contents of which are hereby incorporated by reference.

Although some cell phones incorporate illuminated keys beneath a display, one implementation applied to mobile telephony devices, such as cell phones or PDAs, would include selectively illuminating only certain keys (or softkeys if provided) to correspond to display items on the display of the cellular telephone. Cellular telephones also have numerous functional controls, perhaps more than desktop telephones, such as "airport mode," "vibrate mode, "blue tooth," etc. The selective illumination of keys provides the user with the ability to quickly evaluate the settings of such functions. For example, if three icons or labels were on the display screen at one time, the user would instantly know if the airport mode was on or off, if the vibration setting for incoming calls was on or off, and/or if the blue tooth transceiver was on or off, simply by viewing the key board, e.g., the illuminated or non-illuminated keys.

Accordingly, the key board would act as an extended display, which would free up the relatively small display of a cellular telephone to show larger icons, etc. Accordingly, standalone softkeys in a button array, or existing keys, such as alphanumeric keys in a phone keypad may be used to provide selective illumination corresponding to an icon or label array which is displayed on a display screen of any telephony device. The alphanumeric keys may be included in an ISO (International Standards Organization), alphanumeric keypad for telephony devices, e.g., for cellular phones, for PDAs, and/or for deskphones. For example, the keypad may be a standard ISO, alphanumeric keypad for a deskphone shown in FIG. 1. The user interface may include separate softkeys, integrate the functionality of the softkeys into the alphanumeric keypad, or any combination thereof.

The coordinated display of softkey labels and the control of the associated functions and options may be implemented through hardware, firmware, a software module executed by a processor within the telephony device, or in a combination of the two. A software module may reside in RAM memory, flash memory, ROM memory, EPROM memory, EEPROM memory, registers, hard disk, a removable disk, a CD-ROM, or any other form of storage medium known in the art and capable of residing within the telephony device or associated network. An exemplary storage medium is coupled to the processor such that the processor can read information from, and write information to, the storage medium. In the alternative, the storage medium may be integral to the processor.

Accordingly, one implementation can include a computer readable media embodying a method for selectively illuminating one or more softkeys in a button array on a display, wherein the softkeys are illuminated depending on the current setting for a corresponding softkey label in a softkey label array presented on a display of a telephony device. The computer readable media may be resident in the client device, on a network, or in any combination thereof. Accordingly, the invention is not limited to illustrated examples and any device for performing the functionality described herein are included in embodiments of the invention.

Although detailed embodiments and implementations have been described above, it should be apparent that various modifications are possible without departing from the spirit and scope of the present invention.

What is claimed is:

1. A user interface for a telephony device, comprising:
    a display device configured to display a label array, the label array including labels each representing a discrete function or feature associated with the telephony device; and
    a button array in the vicinity of the display device, the button array including buttons, each button configured to control a discrete function or feature for the telephony device and corresponding to a respective label within the label array, wherein one or more of the buttons are configured to be selectively and dynamically illuminated to indicate a first operational state of the respective feature or function and to be non-illuminated to indicate a second operational state of the respective feature or function.

2. The user interface according to claim 1, wherein the display device is configured to display a first set of labels and an alternative, second set of labels, the labels being arranged in at least two rows and two columns and the button array includes at least two rows and two columns of buttons.

3. The user interface according to claim 2, wherein the one or more buttons are configured to selectively illuminate to indicate operational states of corresponding labels in each of the first set of labels and the second set of labels depending upon which set of labels is displayed in the label array.

4. The user interface according to claim 3, wherein the display device is configured to dynamically update a representation of a label in the label array depending upon the first operational state of the respective function or feature and in response to an input received at a corresponding button in the button array.

5. The user interface according to claim 4, wherein the one or more buttons comprise softkeys.

6. The user interface according to claim 1, further comprising an alphanumeric, telephony keypad separate from the button array.

7. The user interface according to claim 6, wherein the alphanumeric telephony keypad is an ISO (International Standards Organization) standard alphanumeric telephony keypad.

8. The user interface according to claim 1, wherein the button array comprises softkeys.

9. The user interface according to claim 1, further comprising an alphanumeric, telephony keypad, wherein the button array is part of the alphanumeric keypad.

10. The user interface according to claim 9, wherein the alphanumeric telephony keypad is an ISO (International Standards Organization) standard alphanumeric telephony keypad.

11. The user interface according to claim 1, wherein the button array comprises eight softkeys.

12. The user interface according to claim 1, wherein the display device is configured to display eight labels in the label array at a time.

13. The user interface according to claim 1, wherein the display device is configured to display multiple sets of labels, one set of labels at a time, and a number of labels in each set of labels equals a number of buttons in the button array.

14. The user interface according to claim 12, wherein the button array comprises softkeys, each softkey being associated with a corresponding label in the label array.

15. The user interface according to claim 13, wherein the button array consists of eight softkeys and each set of labels consists of eight labels.

16. A telephony device, comprising:
a user interface having a display device and a button array arranged in the vicinity of the display device,
the display device being configured to display a label array, the label array including labels each representing a discrete function or feature associated with the telephony device; and
the button array including buttons each being configured to control a discrete function or feature for the telephony device and corresponding to a respective label within the label array, wherein one or more of the buttons are configured to be selectively and dynamically illuminated to indicate a first operational state of the respective feature or function and to be non-illuminated to indicate a second operational state of the respective feature or function.

17. The telephony device according to claim 16, wherein the display device is configured to display a first set of labels and an alternative, second set of labels, the labels being arranged in at least two rows and two columns and the button array includes at least two rows and two columns of buttons.

18. The telephony device according to claim 17, wherein the one or more buttons are configured to selectively illuminate to indicate operational states of corresponding labels in each of the first set of labels and the second set of labels depending upon which set of labels is displayed in the label array.

19. The telephony device according to claim 16, wherein the one or more buttons comprise softkeys.

20. The telephony device according to claim 16, further comprising an alphanumeric, telephony keypad separate from the button array.

21. The telephony device according to claim 20, wherein the alphanumeric telephony keypad is an ISO (International Standards Organization) standard alphanumeric telephony keypad.

22. The telephony device according to claim 16, wherein the button array comprises softkeys.

23. The telephony device according to claim 16, further comprising an alphanumeric, telephony keypad, wherein the button array is part of the alphanumeric keypad.

24. The telephony device according to claim 23, wherein the alphanumeric telephony keypad is an ISO (International Standards Organization) standard alphanumeric telephony keypad.

25. The telephony device according to claim 16, wherein the button array comprises eight softkeys.

26. The telephony device according to claim 16, wherein the display device is configured to display eight labels in the label array at a time.

27. The telephony device according to claim 16, wherein the display device is configured to display multiple sets of labels, one set of labels at a time, and a number of labels in each set of labels equals a number of buttons in the button array.

28. The telephony device according to claim 16, wherein the button array comprises softkeys, each softkey being associated with a corresponding label in the label array.

29. The telephony device according to claim 28, wherein the button array consists of eight softkeys and each set of labels consists of eight labels.

30. The telephony device according to claim 16, wherein the telephony device is a deskphone, cellular phone, or PDA.

31. A method for managing user control settings associated with a telephony device, comprising:
displaying a label array on a display device of the telephony device, the label array including labels each representing a discrete function or feature associated with the telephony device;
selectively or dynamically illuminating one or more buttons on a button array of the telephony device to indicate a first operational state of a respective feature or function for the telephony device, wherein each button is configured to control a discrete function or feature for the telephony device and corresponds to a respective label within the label array; and
selectively and dynamically turning off an illumination feature of one or more buttons on the button array to indicate a second operational state of the respective feature or function for the telephony device.

32. The method according to claim 31, wherein the label array includes labels arranged in rows and columns and the button array includes softkeys arranged in rows and columns, wherein a layout of the labels in the label array substantially corresponds to a layout of the softkeys in the button array.

33. The method according to claim 32, further comprising dynamically updating a representation of a label in the label array depending upon the first operational state of the respective function or feature.

34. A computer-readable medium having computer-executable instructions contained therein for a method for managing user control settings associated with a telephony device, the method comprising:
displaying a label array on a display device of the telephony device, the label array including labels each representing a discrete function or feature associated with the telephony device;

selectively and dynamically illuminating one or more buttons on a button array of the telephony device to indicate a first operational state of a respective feature or function for the telephony device, wherein each button is configured to control a discrete function or feature for the telephony device and corresponds to a respective label within the label array; and selectively and dynamically turning off an illumination feature of one or more buttons on the button array to indicate a second operational state of the respective feature or function for the telephony device.

* * * * *